US012688026B2

(12) United States Patent
Mohanan et al.

(10) Patent No.: US 12,688,026 B2
(45) Date of Patent: **\*Jul. 21, 2026**

(54) STREAMLINED INSTALLATION AND MANAGEMENT OF REMOTE COMPUTING APPLICATIONS

(71) Applicant: Truist Bank, Charlotte, NC (US)

(72) Inventors: Murali Mohanan, Marietta, GA (US); Deepak Janke, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/746,550

(22) Filed: Jun. 18, 2024

(65) Prior Publication Data

US 2025/0383855 A1     Dec. 18, 2025

(51) Int. Cl.
| | |
|---|---|
| *H04L 29/00* | (2006.01) |
| *G06F 8/61* | (2018.01) |
| *H04L 9/40* | (2022.01) |

(52) U.S. Cl.
CPC .............. G06F 8/63 (2013.01); H04L 63/083 (2013.01)

(58) Field of Classification Search
CPC ................................ G06F 8/63; H04L 63/083
See application file for complete search history.

(56) References Cited

U.S. PATENT DOCUMENTS

| | | | | |
|---|---|---|---|---|
| 6,253,324 | B1 * | 6/2001 | Field | H04L 63/0428 |
| | | | | 713/188 |
| 7,603,347 | B2 * | 10/2009 | Thusoo | G06F 16/86 |
| | | | | 707/E17.127 |
| 9,270,650 | B2 * | 2/2016 | Johnsen | H04L 9/3271 |
| 9,620,171 | B2 * | 4/2017 | Kapa, Jr. | G11B 27/034 |
| 10,601,813 | B2 * | 3/2020 | Kurian | H04L 63/083 |
| 10,771,306 | B2 * | 9/2020 | Upshur | G06F 11/3409 |
| 11,263,021 | B2 * | 3/2022 | Polyakov | G06F 8/63 |
| 12,379,919 | B2 * | 8/2025 | Sandler | G06F 9/45558 |
| 2006/0047974 | A1 * | 3/2006 | Alpern | H04L 67/34 |
| | | | | 726/26 |
| 2008/0147974 | A1 * | 6/2008 | Madison | G06F 12/0897 |
| | | | | 711/E12.043 |
| 2009/0222806 | A1 * | 9/2009 | Faus | G06F 8/63 |
| | | | | 717/168 |
| 2010/0290627 | A1 * | 11/2010 | Tsuji | H04L 9/0825 |
| | | | | 380/282 |
| 2011/0072206 | A1 * | 3/2011 | Ross | G06F 3/0604 |
| | | | | 711/108 |

(Continued)

*Primary Examiner* — Don G Zhao

(74) *Attorney, Agent, or Firm* — Kilpatrick Townsend & Stockton LLP; Michael A. Springs, Esq.

(57)     ABSTRACT

A system for conserving computing and operator resources by streamlining the installation and management of applications on a remote host system, such as a cloud-based system. The system may receive from an operator, a requested modification of an application installation image stored in a secure registry of the remote host system. In response, the system may authenticate the operator, and verify that the requested modification is a permitted modification. The system can also transmit a notification of the requested modification to other operators to allow the other operators an opportunity to object to the requested modification. In the absence of objections, the system may cause the requested modification to be executed.

20 Claims, 4 Drawing Sheets

(56)             References Cited

U.S. PATENT DOCUMENTS

| | | | | |
|---|---|---|---|---|
| 2011/0202443 | A1* | 8/2011 | Martin | G06Q 30/04 |
| | | | | 370/328 |
| 2013/0318520 | A1* | 11/2013 | Abuelsaad | G06F 9/44505 |
| | | | | 717/177 |
| 2014/0033278 | A1* | 1/2014 | Nimashakavi | H04L 63/08 |
| | | | | 726/4 |
| 2014/0181013 | A1* | 6/2014 | Micucci | H04L 63/08 |
| | | | | 707/610 |
| 2014/0230076 | A1* | 8/2014 | Micucci | H04L 63/08 |
| | | | | 726/28 |
| 2015/0019480 | A1* | 1/2015 | Maquaire | G06F 16/2365 |
| | | | | 707/609 |
| 2015/0019559 | A1* | 1/2015 | Maquaire | G06F 16/907 |
| | | | | 707/740 |
| 2016/0034809 | A1* | 2/2016 | Trenholm | G06F 18/285 |
| | | | | 706/20 |
| 2016/0142413 | A1* | 5/2016 | Diep | G06F 21/121 |
| | | | | 726/4 |
| 2016/0224253 | A1* | 8/2016 | Tuers | G06F 3/0688 |
| 2017/0192951 | A1* | 7/2017 | Kollur | G06F 3/048 |
| 2017/0262271 | A1* | 9/2017 | Cross | H04L 67/34 |
| 2019/0121583 | A1* | 4/2019 | Van Vliembergen | |
| | | | | G06F 3/1207 |
| 2019/0208111 | A1* | 7/2019 | Wendel | H04N 23/61 |
| 2019/0238529 | A1* | 8/2019 | Sun | H04L 63/0815 |
| 2021/0035333 | A1* | 2/2021 | Wright | G06V 20/20 |
| 2021/0112045 | A1* | 4/2021 | Siemienczuk | H04L 67/02 |
| 2021/0241259 | A1* | 8/2021 | Kawamoto | G06Q 30/0607 |
| 2021/0279381 | A1* | 9/2021 | Bowen | G06F 30/12 |
| 2021/0357542 | A1* | 11/2021 | Bowen | G06Q 30/0621 |
| 2022/0012045 | A1* | 1/2022 | Rudraraju | G06F 8/36 |
| 2022/0075845 | A1* | 3/2022 | Bowen | G06F 30/30 |
| 2022/0252705 | A1* | 8/2022 | Siessegger | G01S 7/4913 |
| 2022/0405413 | A1* | 12/2022 | Yokoyama | G06T 11/00 |
| 2023/0065966 | A1* | 3/2023 | Clow, II | G06Q 20/3678 |
| 2023/0368184 | A1* | 11/2023 | Polasa | G06Q 20/363 |
| 2023/0393829 | A1* | 12/2023 | Panikkar | G06F 11/3006 |
| 2024/0095810 | A1* | 3/2024 | Senior | G06Q 20/20 |
| 2024/0126783 | A1* | 4/2024 | Wong | G06F 16/2379 |
| 2024/0126911 | A1* | 4/2024 | Vora | G06F 21/6227 |
| 2024/0214194 | A1* | 6/2024 | Kapur | H04L 9/088 |
| 2024/0362148 | A1* | 10/2024 | Mohan | H04L 63/20 |
| 2024/0362559 | A1* | 10/2024 | Lahiri | G06Q 10/06315 |
| 2024/0364509 | A1* | 10/2024 | Potlapally | H04L 63/107 |
| 2024/0364606 | A1* | 10/2024 | Sielinski | H04L 43/028 |
| 2024/0364689 | A1* | 10/2024 | Potlapally | H04L 63/107 |
| 2024/0364707 | A1* | 10/2024 | Elmenshawy | H04L 63/102 |
| 2024/0364747 | A1* | 10/2024 | Gilburd | H04L 63/0272 |
| 2025/0286888 | A1* | 9/2025 | Small | H04L 63/0815 |

* cited by examiner

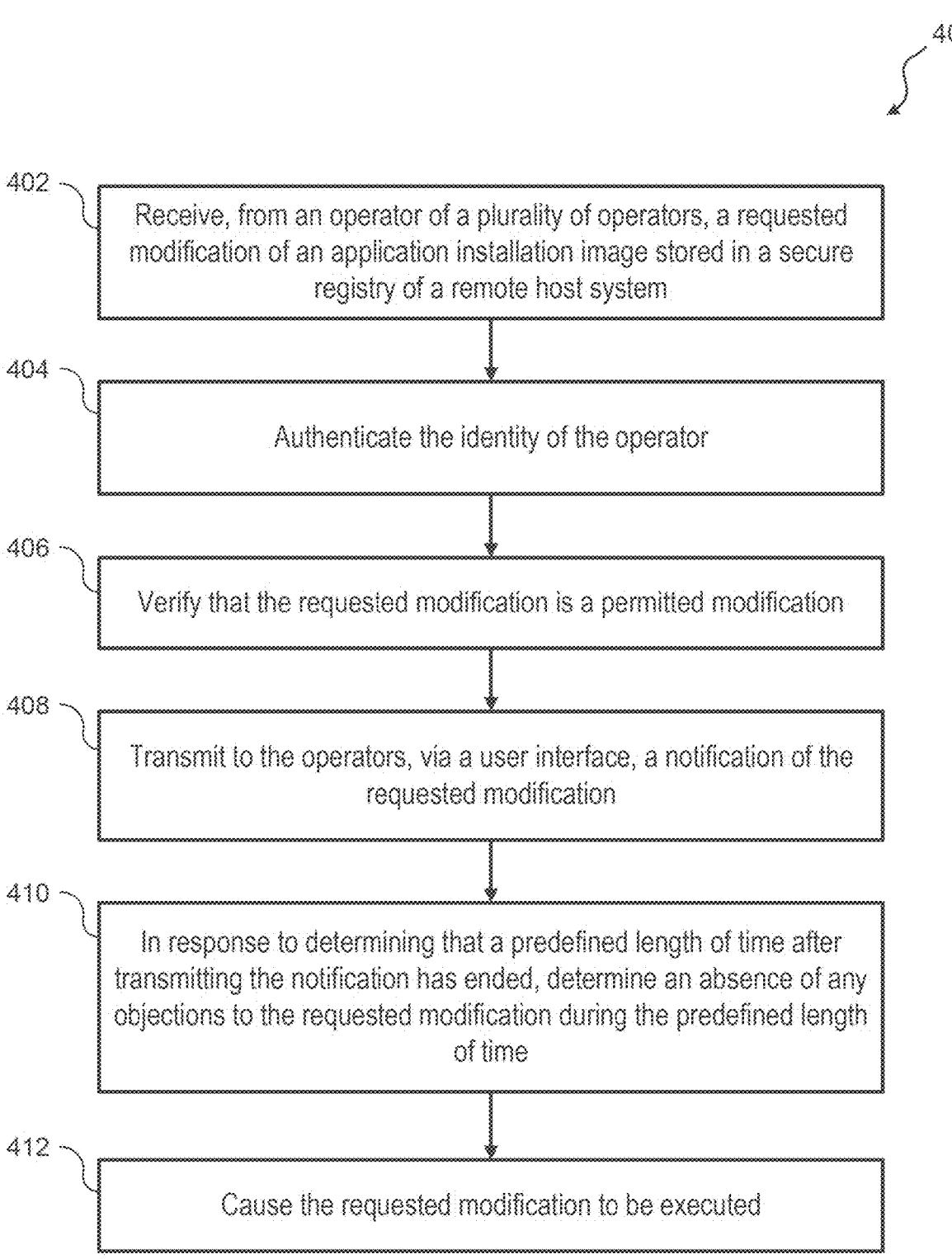

400

402  Receive, from an operator of a plurality of operators, a requested modification of an application installation image stored in a secure registry of a remote host system 404  Authenticate the identity of the operator 406  Verify that the requested modification is a permitted modification 408  Transmit to the operators, via a user interface, a notification of the requested modification 410  In response to determining that a predefined length of time after transmitting the notification has ended, determine an absence of any objections to the requested modification during the predefined length of time 412  Cause the requested modification to be executed

FIG. 4

STREAMLINED INSTALLATION AND MANAGEMENT OF REMOTE COMPUTING APPLICATIONS

TECHNICAL FIELD

The present disclosure relates generally to computing infrastructure, and more particularly, although not exclusively, to conserving computing and user resources through decentralized but authorized installation and management of remote computing applications.

BACKGROUND

In computing system infrastructure, operators of a computing system are frequently located remotely from the various components of the computing system. Various operators may also be located remotely from each other. For example, a computing system of an entity may be hosted by a cloud service provider, where various applications associated with the computing system execute on physical or virtual servers of the cloud service provider rather than at a traditional data center where the system operators are located. Such computing systems involve complicated and resource consuming management activities to execute and maintain, particularly when multiple operators are responsible for various aspects and the operators represent different interests of the entity and are located remotely from each other.

SUMMARY

According to one example of the present disclosure, a system may include a processor, and a memory that is communicatively coupled to the processor and includes instructions that are executable by the processor to cause the processor to perform operations. The operations may include receiving, over a network via a user interface, from an operator of a plurality of operators, a requested modification of an application installation image stored in a secure registry of a remote host system. The operations may also include authenticating an identity of the operator, and verifying that the requested modification is a permitted modification by comparing the requested modification to a stored set of predetermined permitted modifications. The operations may additionally include transmitting a notification of the requested modification to at least some of the plurality of operators via the user interface, the notification identifying the operator and including or enabling a feedback interface for receiving and logging operator objections to the requested modification that are made within a predefined length of time. The operations may further include, in response to determining that the predefined length of time after transmitting the notification has ended, determining an absence of any logged objections to the requested modification during the predefined length of time. The operations may yet further include, based on determining the absence of any logged objections, causing the requested modification to be executed.

According to another example of the present disclosure, a computer-implemented method may include receiving, by a processor, over a network via a user interface, from an operator of a plurality of operators, a requested modification of an application installation image stored in a secure registry of a remote host system. The method may also include authenticating, by the processor, an identity of the operator, and verifying, by the processor, that the requested modification is a permitted modification, by comparing the requested modification to a stored set of predetermined permitted modifications. The method may additionally include transmitting, by the processor, a notification of the requested modification to at least some of the plurality of operators via the user interface, the notification identifying the operator and including or enabling a feedback interface for receiving and logging operator objections to the requested modification that are made within a predefined length of time. The method may further include, in response to determining that the predefined length of time after transmitting the notification has ended, determining, by the processor, an absence of any logged objections to the requested modification during the predefined length of time. The method may yet further include, based on determining the absence of any logged objections, causing the requested modification to be executed.

According to another example of the present disclosure, a non-transitory computer readable medium may contain instructions that are executable by a processor to cause the processor to perform operations. The operations may include receiving, over a network via a user interface, from an operator of a plurality of operators, a requested modification of an application installation image stored in a secure registry of a remote host system. The operations may also include authenticating an identity of the operator, and verifying that the requested modification is a permitted modification by comparing the requested modification to a stored set of predetermined permitted modifications. The operations may additionally include transmitting a notification of the requested modification to at least some of the plurality of operators via the user interface, the notification identifying the operator and including or enabling a feedback interface for receiving and logging operator objections to the requested modification that are made within a predefined length of time. The operations may further include, in response to determining that the predefined length of time after transmitting the notification has ended, determining an absence of any logged objections to the requested modification during the predefined length of time. The operations may yet further include, based on determining the absence of any logged objections, causing the requested modification to be executed.

BRIEF DESCRIPTION OF THE DRAWINGS

FIG. 4 is a flowchart of a computer-implemented method for streamlining the installation and management of remote computing applications, according to one example of the present disclosure.

DETAILED DESCRIPTION

Figure 1:
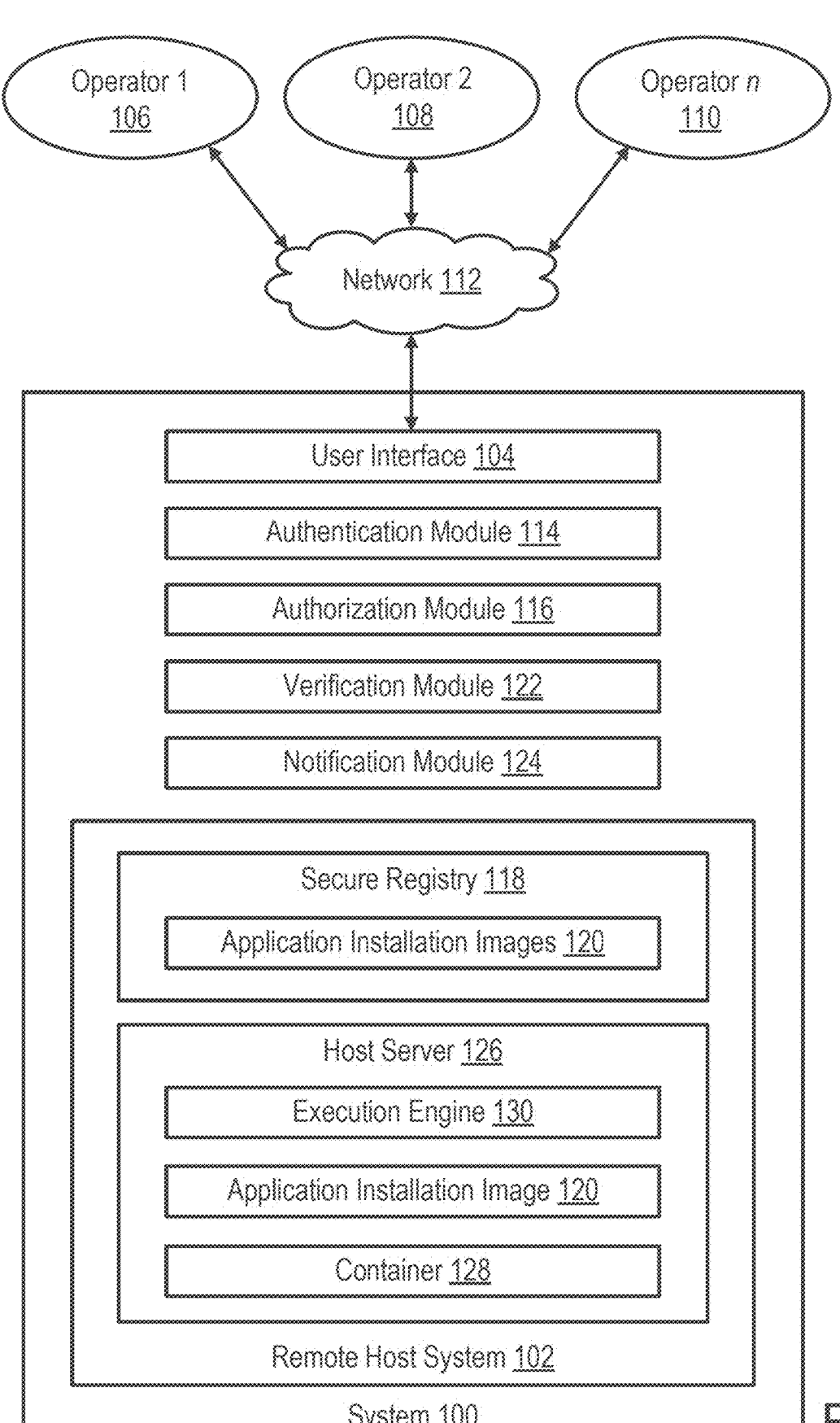
FIG. 1 is a block diagram of a system that can streamline the installation and management of remote computing applications, according to an example of the present disclosure.

Certain aspects and features of the present disclosure relate to a system for conserving computing and operator resources by streamlining the installation and management of applications on a host system, such as a remote host system. The system can also be secure, as application installation and management operations may be restricted to operators with appropriate authorization. The system may be a decentralized system in that the operators can be located remotely from the host system and at least some of the operators may be located remotely from each other.

Some examples can ensure that a requested application installation or management operation is a permitted operation. For example, when the requested application installation or management operation is a requested modification to an application installation image, the system can determine if the requested modification is a permitted modification. In one example, determining if the requested modification is a permitted modification may comprise comparing the requested modification to a stored set of predetermined permitted modifications. The stored set of predetermined permitted modifications may be modifications, or categories of modifications, that have been identified as permissible by the operators. The predetermined permitted modifications can be stored, for example, in a memory associated with a processor of the system, or in a database accessible by the processor.

Multiple operators may be authorized to install and manage remote computing applications, and the operators may represent different interests of an entity associated with the applications. Some examples can also ensure that an application installation or management operation requested by one operator will not be objected to by another operator prior to execution of the requested application installation or management operation by the system. In this regard, when an operator requests performance of an application installation or management operation, the system may generate a notification and may transmit the notification to the other operators having appropriate application installation or management authorization. The operator making the request may be identified in the notification. The other operators may be presented with a feedback interface or a feedback interface may be opened or enabled by or through the notification. An objection to a requested application installation or management operation can be entered and logged via the feedback interface. The receipt of such an objection can cause the system to postpone or prohibit execution of a requested application installation or management operation.

In some examples, the host system may be a remote host system. For example, the remote host system may be a cloud services provider, where applications run on virtual or physical servers of the cloud services provider. Application installation to the remote host system may involve storing an application installation image in a secure registry on the remote host system. The application installation image can thereafter be run to create a container and to execute the application functions within the container. The operators may be authorized to access the secure registry and to add, modify, delete, run, etc., application installation images, subject to operator access levels and other safeguards such as those described above.

In some examples, streamlining the application installation and management process can involve providing a user interface that is accessible to and usable by the operators upon appropriate authentication. The user interface can allow for shared and decentralized operator access to the remote host system and to the secure registry. The user interface can serve as a communications portal through which operators can request the performance of application installation and management operations at the remote host system level. The user interface can also serve as a communications conduit through which application installation and management operation requests can be conveyed to the remote host system and through which notifications and feedback regarding the same can be shared with the operators and with the system.

Streamlining application installation and management operations in the above-described manner can conserve computing resources. For example, computing resources can be conserved by using the shared user interface to cause application installation and management operations to be performed at a central, remote system level. This eliminates the need for each operator to have and utilize computing resources sufficient to perform application installation and management operations at a local level. Operator resources may be conserved by, for example, reducing the time required for an operator to effectuate an application installation or management operation, and by reducing or avoiding requests for or execution of redundant application installation and management operations. Operator resources may also be conserved by preventing the execution of an objectionable application installation and management operation that might subsequently need to be reversed or remediated.

These illustrative examples are provided to introduce the reader to the general subject matter discussed herein, and are not intended to limit the scope of the disclosed concepts. In the following description, various additional features and examples are described with reference to the drawings in which like numerals indicate like elements. Various implementations may be practiced without these specific details, and features can be combined together. The figures and description are not intended to be restrictive.

FIG. 1 is a block diagram illustrating one example of a computing environment within which a system 100 may be utilized to streamline the installation and management of remote computing applications. In some examples, the system 100 may be a computing system 100 including various processing and other hardware and software or application components. The system 100 may be a standalone computing system, a server, or a distributed computing system having multiple servers, virtual machines, etc. The system 100 may include a remote host system 102 on which applications are stored and executed. In other examples, the system 100 may be a part of the remote host system 102. In some examples, the remote host system 102 may be a cloud-based system, and the system 100 may include at least a portion of the remote host system 102.

As depicted, the system 100 can include a user interface 104 that is accessible to and usable by an operator, or a plurality of operators 106, 108, 110. The operators 106, 108, 110 can communicate with the user interface 104 over a network 112. The network 112 can provide operator access to the remote host system 102 using the user interface 104. In some examples, the network 112 can be a local area network (LAN), a wide-area network (WAN) such as the Internet, an institutional network, cellular or other wireless networks, virtual networks such as an intranet or an extranet, etc. In the example of FIG. 1, the network 112 is the Internet. This allows the operators 106, 108, 110 to easily access the remote host system 102 while located at virtually any distance from the remote host system 102, and from each other.

The system 100 may also include an authentication module 114 that is usable to authenticate the identities of the operators 106, 108, 110. In some examples, the authentication module 114 may employ a password-based authentication technique. For example, the authentication module 114 may collect and analyze operator information, such as a user identification (e.g., username) and an associated password. The user identification and password information may then be compared against known valid user identification and password data. The known user identification and password data may be stored as entries in a database or can be otherwise made accessible to the authentication module 114. In other examples, the authentication module 114 may utilize multi-factor identification, certificate-based identification, etc.

In another example, the authentication module 114 may employ a token-based authentication technique. For example, an operator can enter verification credentials (e.g., a username and password) into the user interface 104, which results in the sending of a unique authentication token to the operator 106, 108, 110. The unique authentication token can subsequently be used in the process of authorizing operator use of the user interface 104. The unique authentication token may be a temporary token that expires after some predetermined length of time, or the unique authentication token may expire after one use or some predetermined number of uses. In some examples, the unique authentication token may be a JSON web token.

When the authentication module 114 assigns a unique authentication token to an operator 106, 108, 110, the unique authentication token may be transmissible with communications between the operator and the remote host system 102. In some examples, the unique authentication token can be used to authenticate the operator to the remote host system or to identify the operator to other operators of the plurality of operators.

The system may further include an authorization module 116. The authorization module 116 can determine whether a given operator of the operators 106, 108, 110 is authorized to access the remote host system. The authentication module 114 may also be usable to determine an authorized access level for each of the operators 106, 108, 110. The authorized access level can at least define constraints on modifications a given operator is permitted to make to an application installation image 120 stored on the remote host system 102. The access level may also determine other limits related to the ability of the operators 106, 108, 110 to access, interact with, and make modifications to applications or other elements of the remote host system 102.

In some examples, the remote host system 102 may be one or more physical servers or virtual servers of a cloud services provider. The remote host system 102 includes a secure registry 118, as described above. One or more application installation images 120 may be stored in the secure registry 118. One or more of the application installation images 120 may be a customized application image. An application installation image can include any application code, libraries, tools, dependencies and other files required for the application to run. A customized application installation image may also include additional instructions to install custom files or specific packages, configure environment variables, etc., that are unique to or required by the job associated with the application. For example, an application installation image may be customized according to functional, security, and other requirements specifically associated with processing a wire transfer request (i.e., for wire payment initiation).

Once communication between the operators 106, 108, 110 and the remote host system 102 has been authorized and established, the system 100 may receive, via the user interface, from a given operator of the operators 106, 108, 110, a request to perform an application installation or management operation. For example, the system 100 may receive a requested modification of an application installation image 120 stored in the secure registry 118 of the remote host system 102.

When the system 100 receives a requested modification of an application installation image 120 from an operator, the system 100 may use a verification module 122 to verify that the requested modification is a permitted modification. For example, the verification module 122 may compare the requested modification to a stored set of predetermined permitted modifications. Based at least in part on the verification module 122 verifying that the requested modification is a permitted modification, the system 100 may transmit a notification of the requested modification to at least some of the operators 106, 108, 110 via the user interface 104. The notification may be generated and transmitted by a notification module 124 of the system 100. The notification module 124 may be communicatively coupled to the user interface 104.

The notification may identify the operator and may include, open, or otherwise enable a feedback interface for receiving and logging operator objections to the requested modification that are made within a predefined length of time. In some examples, the feedback interface may be a text-based interface through which an operator may enter a written objection to the requested modification. In other examples, the feedback interface may be a graphical user interface through which an operator can check a box or perform another simplistic (non-textual) operation that generates an objection to the requested modification. For example, checking an appropriate box may generate a warning flag to the system 100 relative to a given requested modification.

After transmitting the notification of the requested modification to at least some of the plurality of operators 106, 108, 110, the system 100 may wait for a predefined length of time to see if any of the operators 106, 108, 110 object to the requested modification. There may be no particular restriction on the predefined length of time. For example, the predefined length of time may be minutes, hours, days, etc. The value of the predefined length of time may depend at least in part on the urgency associated with the requested modification. In at least some examples, the predefined length of time may have an adjustable value.

Once the predefined length of time has passed, the system 100 can determine whether an objection(s) to the requested modification was received from any of the operators 106, 108, 110 within the predefined length of time. If an objection was received, the system 100 may postpone or prohibit the requested modification. For example, in the course of deciding to prohibit the requested modification, the system 100 may consider factors such as the respective authorized access levels of the operator that requested the modification and the operator(s) that objected to the modification, a level of urgency associated with (e.g., assigned to) the requested modification, the specific nature of the requested modification, etc. If the system 100 decides to postpone the requested modification, the system 100 may send out an additional notification to at least the operator that requested the modification and the operator(s) that objected to the modification. In addition to notifying the operators that the requested modification has been postponed, the notification may define a period of postponement. If operator communications about the objection(s) during the period of postponement resolve the objection(s), the objection(s) may be withdrawn. Otherwise, the system 100 can determine at the end of the period of postponement whether to prohibit or execute the requested modification. This decision by the system 100 may be based on one or more factors such as, but not limited to, those described above.

The system 100 may alternatively detect or determine an absence of any logged objections to the requested modification during the predefined length of time. Based on determining the absence of any logged objections, the system 100 may cause the requested modification to be executed. For example, the system 100 may modify an application installation image 120 stored in the secure registry 118 of the remote host system 102 according to instructions provided by the operator.

In at least some examples, executing the requested modification can involve pulling (or pushing) an application installation image 120 to a host server 126 of the remote host system 102, and thereafter causing the application installation image 120 to run on the host server 126. Causing the application installation image 120 to run on the host server 126 can result in the generation of a container 128 within which the application installed by the application installation image 120 runs. An execution engine 130 may be responsible for creating, deploying, and managing applications defined by the application installation images 120 stored in the secure registry 118 and executed (run) in containers 128 on the host server 126. The remote host system 102 is presented herein only as one example. Other remote host system architectures are also possible.

Figure 2:
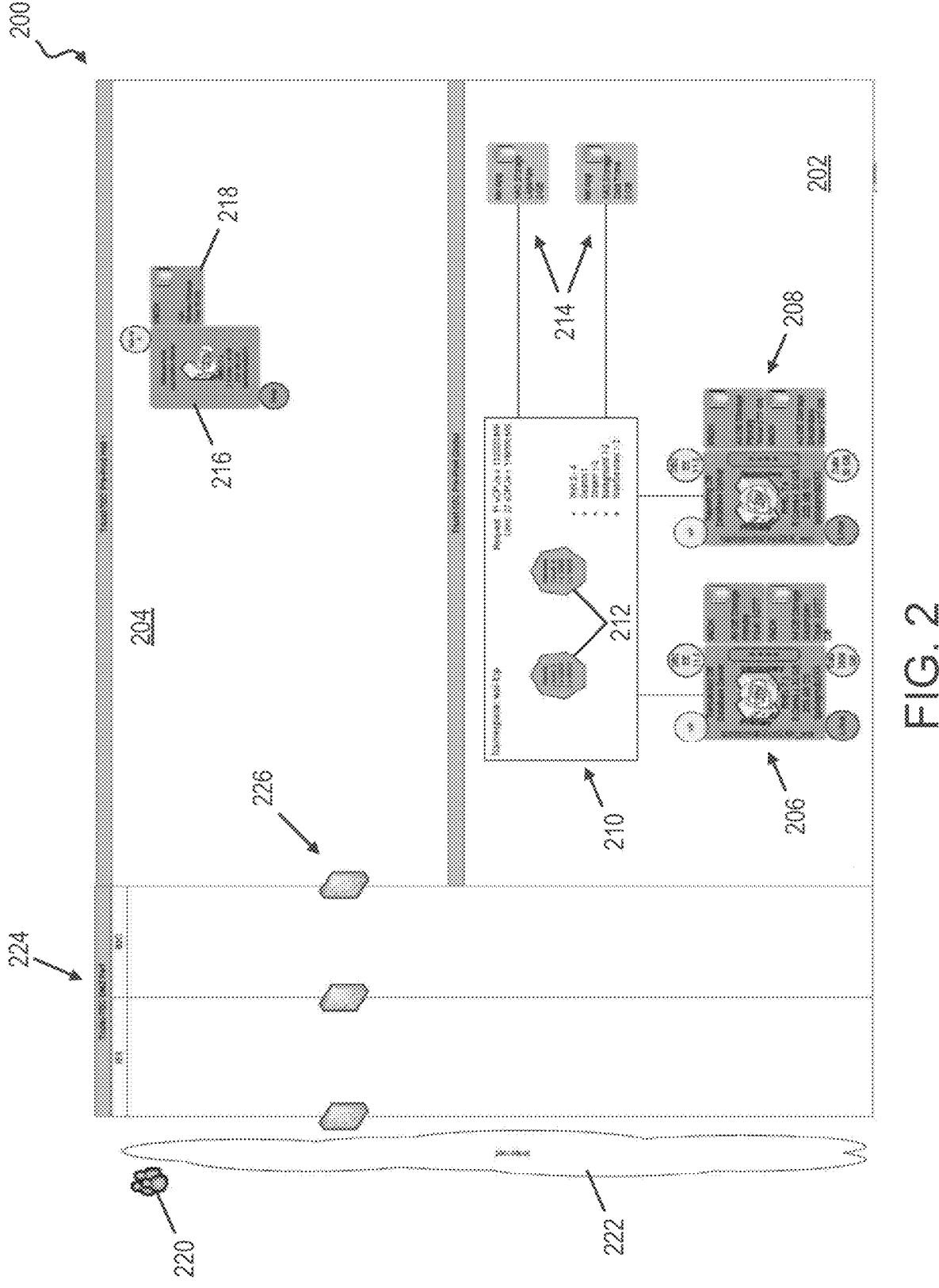
FIG. 2 is a block diagram of a cloud-based system for processing user action requests using remote computing applications, according to an example of the present disclosure.

FIG. 2 is a block diagram of a cloud-based system 200 for processing user action requests using remote computing applications, according to an example of the present disclosure. In the example of FIG. 2, the cloud-based system 200 is configured to execute user action requests in the form of wire transfer requests—i.e., the cloud-based system 200 may be a wire payment initiation system. However, the cloud-based system 200 of FIG. 2 is provided only for illustration, and other examples of cloud-based systems may be configured to execute other types of user action requests.

As shown, the cloud-based system 200 may include a cloud-based portion 202 and a local portion 204. The local portion may comprise, for example, various computing components located at a traditional data center. The cloud-based portion 202 may be configured to run applications that are usable to execute wire payment initiation requests. In the case of the cloud-based system 200 of FIG. 2, for example, the cloud-based portion 202 of the system is shown to include a transaction server 206 and a database server 208. The transaction server 206 and the database server 208 may be virtual servers. Additional virtual servers may be added as necessary to meet wire payment request volume, to increase wire payment processing speed, etc.

The applications running on the cloud-based portion 202 of the cloud-based system 200 may be installed from one or more application installation images, which may be stored in a secure registry on the transaction server 206 or the database server 208, for example. The transaction server 206 and the database server 208 may be communicatively coupled to the host server 210 at least for this purpose. The secure registry may alternatively reside on one or more other storage devices, such as the network accessible storage (NAS) devices 214 shown.

Placing an application installation image on the host server 210 and running the application installation image can create a container 212 within which the application associated with the application installation image can run. The host server 210 can include an execution engine that may be responsible for creating, deploying, and managing applications defined by the application installation images stored in the secure registry.

The local portion 204 of the cloud-based system 200 according to the example of FIG. 2, can include a backup server 216. In this example, the backup server 216 is a witness node application server that may store system metadata in case of a site failure. For metadata storage purposes, the witness node application server may be associated with a database 218, such as a virtual hard disk drive.

Remotely located users 220 may transmit wire payment initiation requests to the cloud-based wire payment initiation system 200 via a network such as the Internet 222. The users 220 may be isolated from the cloud-based portion 202 and the local portion 204 of the cloud-based system 200 by a perimeter (sub) network 224 that can protect the exposed external-facing services of the cloud-based portion 202. One or more firewalls 226 may be provided for this purpose.

Figure 3:
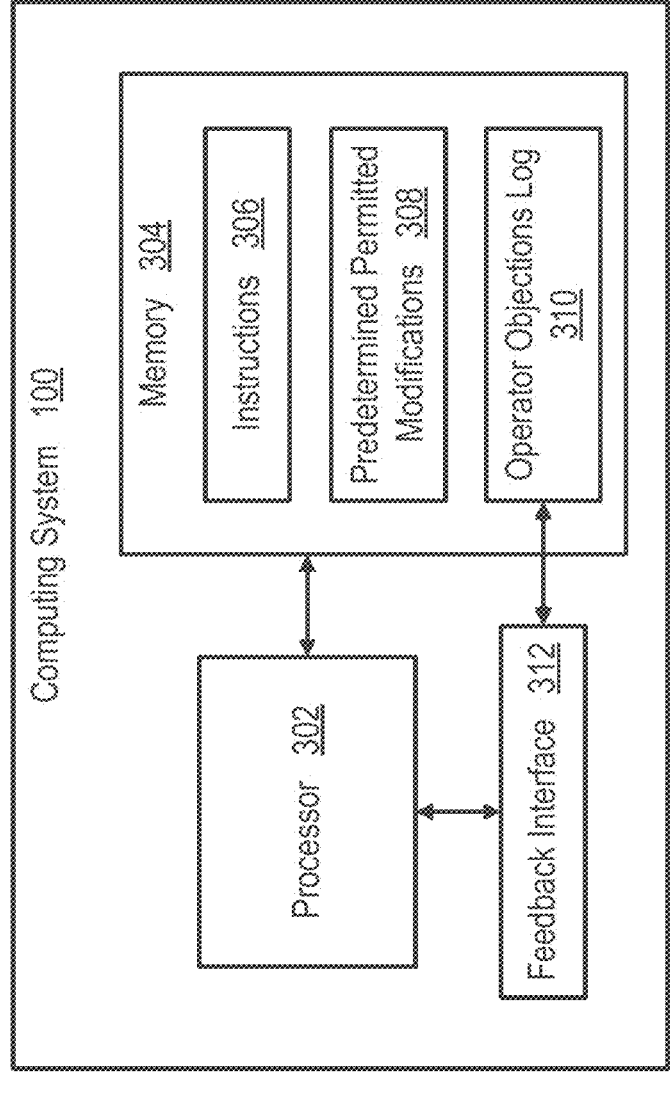
FIG. 3 is a block diagram of various components of a computing system that can be used to streamline the installation and management of remote computing applications, according to another example of the present disclosure.

FIG. 3 is a block diagram illustrating various components of a computing system, such as the computing system 100 of FIG. 1, that is usable to streamline the installation and management of remote computing applications, according to another example of the present disclosure. As illustrated, the computing system 100 may include a processor 302. The processor 302 can include one processing device or multiple processing devices. Non-limiting examples of the processor 302 include a Field-Programmable Gate Array (FPGA), an application-specific integrated circuit (ASIC), a microprocessor, etc. A memory 304 may be communicatively coupled to the processor 302. The memory 304 can include instructions that are executable by the processor 302 to cause the processor 302 to perform operations. In some examples, the instructions 306 can include processor-specific instructions generated by a compiler or an interpreter from code written in a suitable computer-programming language, such as C, C++, C #, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can be a non-transitory computer-readable medium from which the processor 302 can read the instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 302 can read the instructions 306.

In one example, the memory 304 may include a set of predetermined permitted modifications 308. The set of predetermined permitted modifications 308 can be used by the computing system 100 as described above, to verify that a modification associated with an application installation or management operation is a permitted modification. For example, the computing system 100 may verify that a requested modification of an application installation image is a permitted modification by comparing the requested modification to the stored set of predetermined permitted modifications 308.

In one example, the memory 304 may also include an operator objections log 310. The operator objections log 310 may temporarily store objections raised by one or more operators relative to a requested application installation or management operation (e.g., a requested modification of an application installation image). As indicated, operator objections may be received through a feedback interface 312. The feedback interface 312 may be presented to an operator within a notification sent through a user interface (e.g., user interface 104), or may be otherwise opened or enabled by operator interaction with the notification. The processor 302 may be communicatively coupled to the feedback interface 312 and the operator objections log 310 as shown.

FIG. 4 is a flowchart 400 of a computer-implemented method for streamlining the installation and management of remote computing applications, according to one example. According to this example of the computer-implemented method, a requested modification of an application installation image stored in a secure registry of a remote host system may be received by a processor from an operator of a plurality of operators, as shown in block 402. In some examples, the application installation image may be modified by replacing the application installation image with a new application installation image. The remote host system may be a physical server or a virtual server of a cloud services provider in some examples. The requested modification may be received, over a network via a user interface. The operators may be system administrators or other persons having system privileges that allow the operators to request or execute various application installation or management operations. The privileges possessed by each operator may vary, and may be dictated by an authorized access level for each operator. The authorized access level can at least define constraints on modifications a given operator is permitted to make to the application installation image.

As represented in block 404, the identity of the operator requesting the modification may then be authenticated. Various authentication techniques such as a name and password-based technique, a certificate-based technique, etc., may be used for this purpose. In one example, the identity of the operator can be authenticated by assigning a unique authentication token to the operator. The unique authentication token may thereafter be transmitted with communications between the operator and the remote host system. The unique authentication token may also be used to authenticate the operator to the remote host system or to identify the operator to other operators.

At block 406, the processor can verify that the requested modification is a permitted modification. For example, the requested modification can be compared to a stored set of predetermined permitted modifications to determine that the requested modification is a permitted modification. The stored set of predetermined permitted modifications can be stored in a memory associated with the processor, or in a database accessible by the processor.

As indicated in block 408, upon verifying that the requested modification is a permitted modification, the processor may transmit a notification of the requested modification to at least some of the of the operators, which may include some or all of the operators other than the operator who submitted the requested modification. The notification may be transmitted to the operators via the user interface. The notification can include various information. For example, the notification may include a description of the requested modification. The notification may also include a requested time or date associated with the requested modification. The requested time or date can be the time or date when the request was made or a desired time or date of application installation image modification. The notification can identify the operator to the other operators. The notification can also include a feedback interface, or may open or enable a user interface, via which operators can enter objections to the requested modification. Operator objections to the requested modification can be logged. Operator objections entered within a predefined length of time after transmission of the notification can result in a postponement or prohibition of the requested modification.

At block 410, the processor may determine that the predefined length of time after transmitting the notification has ended. In response, the processor can also determine an absence of any logged objections to the requested modification during the predefined length of time. There may be no particular restriction on the predefined length of time, and the value of the predefined length of time may depend on various factors. The predefined length of time may also have an adjustable value in some examples.

Based on determining the absence of any logged objections, the processor can then cause the requested modification to be executed, as indicated at block 412. The requested modification may be executed at a physical or virtual server, etc., of the remote host system, or otherwise. In one example, the requested modification may be executed by the processor.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processor;

a memory communicatively coupled to the processor, the memory including instructions that are executable by the processor to cause the processor to perform operations comprising:

receiving, over a network, from an operator of a plurality of operators, a requested modification of an application installation image stored in a secure registry of a remote host system;

authenticating an identity of the operator and determining that the operator is permitted to make the requested modification based on constraints associated with an authorized access level assigned to the operator;

verifying that the requested modification is a permitted modification by comparing the requested modification to a stored set of categories of modifications that have been identified as permissible by the plurality of operators;

transmitting a notification of the requested modification to each operator of the plurality of operators who is authorized to manage or install the application installation image, the notification identifying the operator and including or enabling a feedback interface for receiving and logging objections to the requested modification by the other operators of the plurality of operators within a predefined length of time, the transmitting occurring only after verifying that the requested modification is a permitted modification;

in response to determining that the predefined length of time after transmitting the notification has ended, determining an absence of any logged objections to the requested modification by any of the other operators of the plurality of operators during the predefined length of time; and based on the absence of any logged objections by any of the other operators of the plurality of operators within the predefined length of time, causing the requested modification to be executed.

2. The system of claim 1, wherein authenticating the identity of the operator includes assigning a unique authentication token to the operator, the unique authentication token transmissible with communications between the operator and the remote host system, and usable to authenticate the operator to the remote host system and to identify the operator to other operators of the plurality of operators.

3. The system of claim 1, wherein the memory further includes:

the stored set of categories of modifications; and an operator objections log that is configured to temporarily store objections raised in response to a requested installation or modification of an application installation image, by any operator of the plurality of operators who is authorized to manage or install the application installation image, the operator objections log communicatively coupled to the feedback interface.

4. The system of claim 1, wherein the modification to the application installation image is replacement of the application installation image with a new application installation image.

5. The system of claim 1, wherein:

the system includes a local portion that is securely separated from a cloud-based portion;

the remote host system is associated with the cloud-based portion and is configured as a wire payment initiation system that utilizes at least one physical server or virtual server of a cloud services provider; and the processor is a component of the remote host system.

6. The system of claim 1, further comprising:

an authentication module configured to authenticate an identity of each operator of the plurality of operators using password-based, certification-based, token-based, or multi-factor identification authentication techniques;

an authorization module configured to regulate an ability of each operator of the plurality of operators to access, interact with, or modify applications, application installation images, or other elements of the remote host system, by determining an authorized access level assigned to each operator and applying access level-based constraints to actions of the operators; and a verification module configured to verify that a requested modification of an application installation image is a permitted modification by comparing the requested modification to a stored set of categories of permitted modifications and to, at least in part, cause notifications of requested modifications to application installation images to be transmitted each operator of the plurality of operators who is authorized to manage or install the application installation image.

7. The system of claim 1, wherein the instructions are further executable by the processor to cause the processor to, after causing the requested modification to be executed:

deploy the application installation image having the requested modification to create a container; and run the container.

8. A computer-implemented method comprising:

receiving, by a processor, over a network, from an operator of a plurality of operators, a requested modification of an application installation image stored in a secure registry of a remote host system;

authenticating, by the processor, an identity of the operator and determining that the operator is permitted to make the requested modification based on constraints associated with an authorized access level assigned to the operator;

verifying, by the processor, that the requested modification is a permitted modification, by comparing the requested modification to a stored set of categories of modifications that have been identified as permissible by the plurality of operators;

transmitting, by the processor, a notification of the requested modification to each operator of the plurality of operators who is authorized to manage or install the application installation image, the notification identifying the operator and including or enabling a feedback interface for receiving and logging objections to the requested modification by the other operators of the plurality of operators within a predefined length of time, the transmitting occurring only after verifying that the requested modification is a permitted modification;

in response to determining that the predefined length of time after transmitting the notification has ended, determining, by the processor, an absence of any logged objections to the requested modification by any of the other operators of the plurality of operators during the predefined length of time; and based on the absence of any logged objections by any of the other operators of the plurality of operators within the predefined length of time, causing the requested modification to be executed.

9. The computer-implemented method of claim 8, further comprising authenticating, by the processor, the identity of the operator by assigning a unique authentication token to the operator, the unique authentication token transmitted with communications between the operator and the remote host system, and used to authenticate the operator to the remote host system and to identify the operator to other operators of the plurality of operators.

10. The computer-implemented method of claim 8, further comprising temporarily storing in an operator objections log, operator objections that are raised in response to a requested installation or modification of an application installation image by any operator of the plurality of operators who is authorized to manage or install the application installation image, and are received by the processor via the feedback interface.

11. The computer-implemented method of claim 8, wherein the application installation image is modified by replacing the application installation image with a new application installation image.

12. The computer-implemented method of claim 8, wherein the request to execute an action is a request to process an electronic transaction, and the application associated with the application installation image is a transaction processing application.

13. The computer-implemented method of claim 8, further comprising, after causing the requested modification to be executed:

creating a container by deploying the application installation image having the requested modification; and running the container.

14. The computer-implemented method of claim 8, further comprising determining, by the processor, whether a given operator of the plurality of operators has accessed the feedback interface after transmitting of the notification of the requested modification.

15. A non-transitory computer-readable medium comprising instructions that are executable by a processor for causing the processor to perform operations comprising:

receiving, over a network, from an operator of a plurality of operators, a requested modification of an application installation image stored in a secure registry of a remote host system;

authenticating an identity of the operator and determining that the operator is permitted to make the requested modification based on constraints associated with an authorized access level assigned to the operator;

verifying that the requested modification is a permitted modification by comparing the requested modification to a stored set of categories of modifications that have been identified as permissible by the plurality of operators;

transmitting a notification of the requested modification to each operator of the plurality of operators who is authorized to manage or install the application installation image, the notification identifying the operator and-including or enabling a feedback interface for receiving and logging objections to the requested modification by the other operators of the plurality of operators within a predefined length of time, the transmitting occurring only after verifying that the requested modification is a permitted modification;

in response to determining that the predefined length of time after transmitting the notification has ended, determining an absence of any logged objections to the requested modification by any of the other operators of the plurality of operators during the predefined length of time; and based on the absence of any logged objections by any of the other operators of the plurality of operators within the predefined length of time, causing the requested modification to be executed.

16. The non-transitory computer-readable medium of claim 15, wherein authenticating the identity of the operator includes assigning a unique authentication token to the operator, the unique authentication token transmissible with communications between the operator and the remote host system, and usable to authenticate the operator to the remote host system and to identify the operator to other operators of the plurality of operators.

17. The non-transitory computer-readable medium of claim 15, wherein the instructions are further executable by the processor to cause the processor to determine an authorized access level for each operator of the plurality of operators, the authorized access level defining constraints on modifications a given operator is permitted to make to the application installation image.

18. The non-transitory computer-readable medium of claim 15, wherein the modification to the application installation image is replacement of the application installation image with a new application installation image.

19. The non-transitory computer-readable medium of claim 15, wherein:

the system includes a local portion that is securely separated from a cloud-based portion;

the remote host system is associated with the cloud-based portion and is configured as a wire payment initiation system that utilizes at least one physical server or virtual server of a cloud services provider; and the processor is a component of the remote host system.

20. The non-transitory computer-readable medium of claim 15, wherein the instructions are further executable by the processor to cause the processor to, after causing the requested modification to be executed:

deploy the application installation image having the requested modification to create a container; and run the container.

* * * * *